United States Patent [19]
Kishimoto

[11] Patent Number: 5,590,564
[45] Date of Patent: Jan. 7, 1997

[54] BICYCLE CONTROL DEVICE

[75] Inventor: Hitoshi Kishimoto, Sakai, Japan

[73] Assignee: Shimano, Inc., Osaka, Japan

[21] Appl. No.: 560,730

[22] Filed: Nov. 20, 1995

[51] Int. Cl.$^6$ .................................................. B62M 25/04
[52] U.S. Cl. ............................ 74/475; 74/489; 74/502.2; 74/108; 74/527
[58] Field of Search ........................... 74/475, 489, 488, 74/502.2, 108, 517, 527, 531, 553

[56] References Cited

U.S. PATENT DOCUMENTS

| | | | |
|---|---|---|---|
| 2,788,676 | 4/1957 | Spexarth | 74/489 |
| 3,633,437 | 1/1972 | Ishida | 74/489 |
| 4,019,402 | 4/1977 | Leonheart | 74/489 |
| 4,900,291 | 2/1990 | Patterson | 474/80 |
| 5,197,927 | 3/1993 | Patterson et al. | 474/80 |
| 5,438,889 | 8/1995 | Tagawa | 74/475 |

FOREIGN PATENT DOCUMENTS

| | | |
|---|---|---|
| 48-2600 | 1/1973 | Japan . |
| 5-270475 | 10/1993 | Japan . |

*Primary Examiner*—Richard M. Lorence
*Attorney, Agent, or Firm*—James A. Deland

[57] ABSTRACT

A bicycle control device wherein a base member is provided for attachment to a structural member of the bicycle, and a control member is mounted for movement relative to the base member. A relay cable has a first end secured relative to the base member and a second end secured relative to the control member so that movement of the control member relative to the base member causes the first end of the cable to move relative to the second end of the cable. A linking member is disposed between the first end of the cable and the second end of the cable for movement with the cable. The linking member has an attachment location for attaching a control element of the bicycle to the linking member. The device may then operate according to the principle of a ruunning block.

23 Claims, 5 Drawing Sheets

BICYCLE CONTROL DEVICE

BACKGROUND OF THE INVENTION

The present invention is directed to a control device for controlling bicycle operating components and, more specifically, to a control device for operating brakes, bicycle transmissions such as hubs and derailleurs, and other devices.

With a conventional bicycle control device, the control displacement of a lever or knob controlled by hand is transmitted to a winder that is linked to one end of a control cable, and this winder reels the control cable in or out depending on the direction of this control displacement. Movement of the control cable results in the actuation of a working device such as a derailleur or brake linked to the other end of the control cable. Cable mechanisms work very well when the position between the manual lever or knob and the winder is in a twisted relation, or in cases in which there is a large gap between the manual lever or knob and the winder.

A bicycle shifting control device in which such a cable mechanism is used is known from Japanese Laid-Open Patent Application 5-270475, for example. With this shifting control device, a manual knob and a winder are linked by a relay cable, and a shifting cable that is linked to the shifter is also linked to the winder. In order to lighten the operating effort required by the manual knob, the winding diameter of the relay cable is made greater than the winding diameter of the shifting cable. With such a device, however, reducing the operating effort by half requires that the winding diameter of the relay cable be twice the winding diameter of the shifting cable, so the winder becomes bulky. As a result the overall shifting control device is large. Consequently, there are problems with a shifting control device such as that described above in terms of mounting site options and the degree of design freedom.

SUMMARY OF THE INVENTION

The present invention is directed to a bicycle control device which provides light operating effort but with a compact and simple construction. In one embodiment of the present invention, a base member is provided for attachment to a structural member of the bicycle, and a control member is mounted for movement relative to the base member. Another member has a first end secured relative to the base member and a second end secured relative to the control member so that movement of the control member relative to the base member causes the first end of the member to move relative to the second end of the member. A linking member is disposed between the first end of the member and the second end of the member for movement with the member. The linking member has an attachment location for attaching a control element of the bicycle to the linking member. The device may then operate according to the principle of a running block.

In a more specific embodiment, the member comprises a cable, and the linking member is disposed for sliding along the cable when the control member moves relative to the base member. The linking member may include a curved surface about which the cable winds, wherein an angle formed by the cable as it deflects about the linking member is between approximately 120 degrees and approximately 180 degrees. In another embodiment, the linking member may include a pulley about which the cable winds. The base member may include a curved peripheral surface and a guide disposed thereon, wherein the linking member is disposed for sliding along the guide. The guide may be oriented generally perpendicular to an axis, and this axis may be oriented generally parallel to the axis of rotation of the control member. Alternatively, the axis may be slanted relative to the axis of rotation.

In another embodiment which provides for multiple levels of force multiplication, a base member is provided for attachment to a structural member of the bicycle, and a control member is mounted for movement relative to the base member. A first member (40a) has a first end secured relative to the base member and a second end secured relative to the control member so that movement of the control member relative to the base member causes the first end of the first member to move relative to the second end of the first member, and a first linking member is disposed between the first end of the first member and the second end of the first member for movement with the first member. A second member has a first end secured relative to the base member and a second end secured relative to the first linking member so that movement of the first linking member relative to the base member causes the first end of the second member to move relative to the second end of the second member. A second linking member is disposed between the first end of the second member and the second end of the second member for movement with the second member, and the second linking member has an attachment location for attaching a control element of the bicycle to the second linking member.

DETAILED DESCRIPTION OF THE EMBODIMENTS

Figure 1:
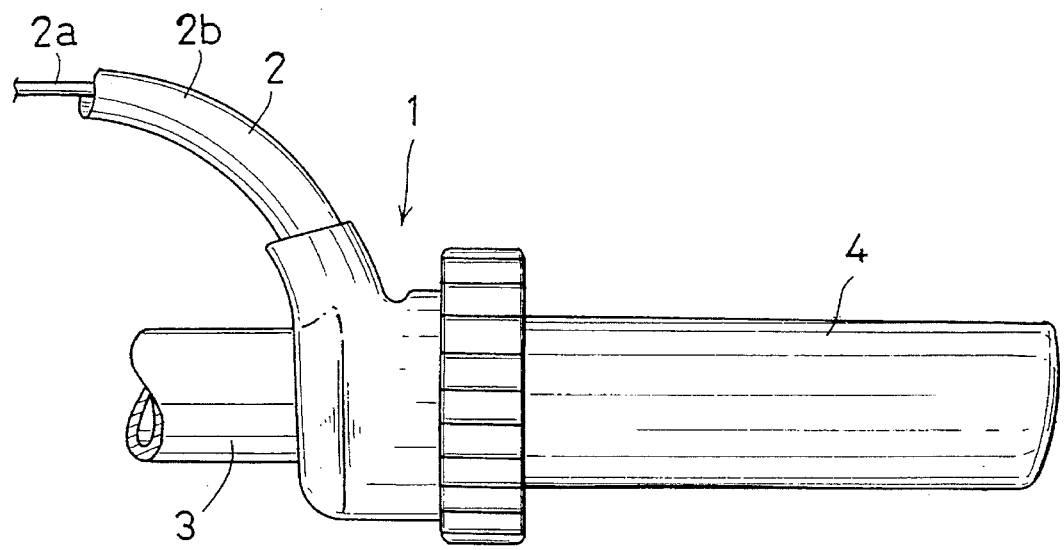
FIG. 1 is an external view of a particular embodiment of a bicycle control device according to the present invention.
Figure 2:
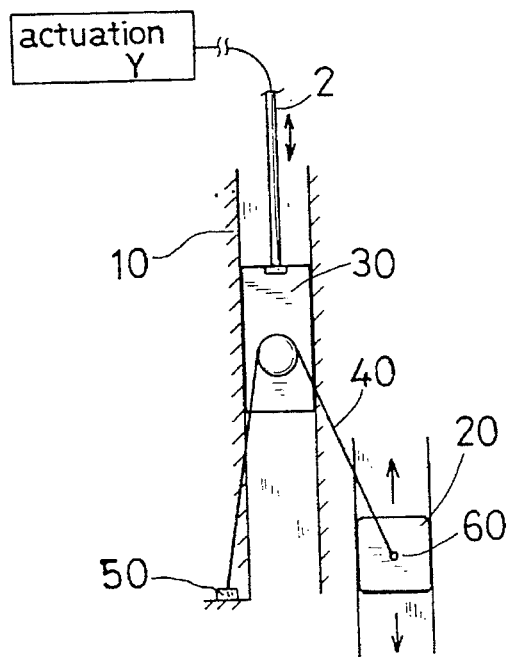
FIGS. 2a–2b diagrams illustrating theories of operation of various embodiments of the present invention.
Figure 2:
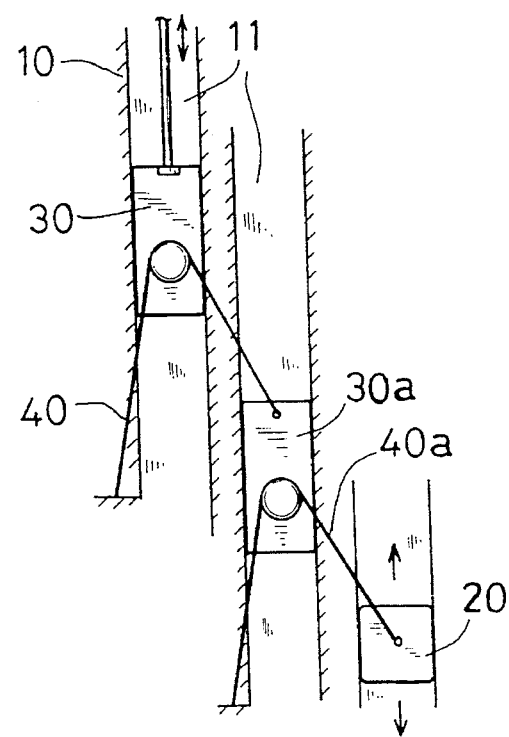

FIG. 1 shows a shifting control device 1 that has been mounted on the handlebar of a bicycle (not shown here) in order to control a derailleur or other such shifting device (as a working device of the bicycle) via a control cable 2. This shifting control device 1 is inserted in and attached to a handlebar 3 next to a grip 4 formed at the end of the handlebar 3, and is equipped with a rotary control 20 that is rotated around the handlebar 3 by the thumb, index finger, etc., of the hand that grips the handlebar FIG. 2a shows the principle construction of this shifting control device 1. The specifics thereof are shown in FIG. 4 as a side view of FIG. 3, which is a partially cut-away oblique view. The shifting control device 1 is equipped with a base member 10 formed in a ring shape that is fitted over and fixed to the handlebar 3, and a rotary control ring 20 that is rotatably mounted as the control member around the outside surface of this base member 10. A relay cable 40 is linked at one end to the base member 10 by a first linking means 50 and at the other end to the rotary control ring 20 by a second linking means 60. A deflection means 30 is guided through a guide groove 11 formed in a spiral around the outside surface of the above-mentioned base member 10. The deflection means 30 deflects the extension direction of the relay cable 40 in the opposite direction by being wound with the middle region of the relay cable 40.

The first linking means 50 comprises [i] a stepped through hole 12 provided to the flange of the above-mentioned base member 10 in parallel to the axis X and [ii] an anti-slip nipple that is connected to the end of the relay cable 40 that has passed through the small diameter portion 12a of this stepped through hole 12 and that is housed in the large diameter portion 12b of this stepped through hole 12. The second linking means 60 has essentially the same structure as the above-mentioned first linking means 50, so detailed illustration and description thereof will be omitted here.

Figure 6:
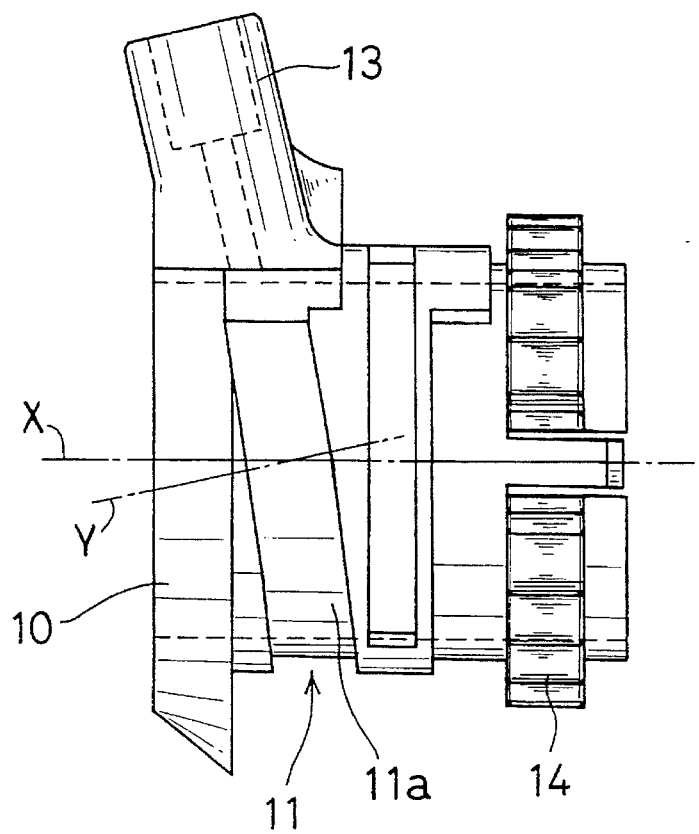
FIG. 6 is a front view of a particular embodiment of a base member used in the shifting control device shown in FIG. 1.

To facilitate understanding, the base member 10 is shown in FIG. 6 in a state prior to its attachment. The basic shape is one of a cylinder with relatively thin walls provided with a through hole having an axis X through which the handlebar 3 will be inserted. A control cable guide nozzle 13, provided with a small diameter hole through which the inner cable 2a of the control cable 2 is passed and a large diameter hole in which the outer cable 2b is fixed, projects outward in the diameter direction from one side of this base member 10. A guide groove 11 that extends in a direction that is slightly slanted from the diameter direction is formed around the outside surface of the cylinder corresponding to this nozzle 13. In other words, this guide groove 11 is in the form of a spiral.

Figure 5:
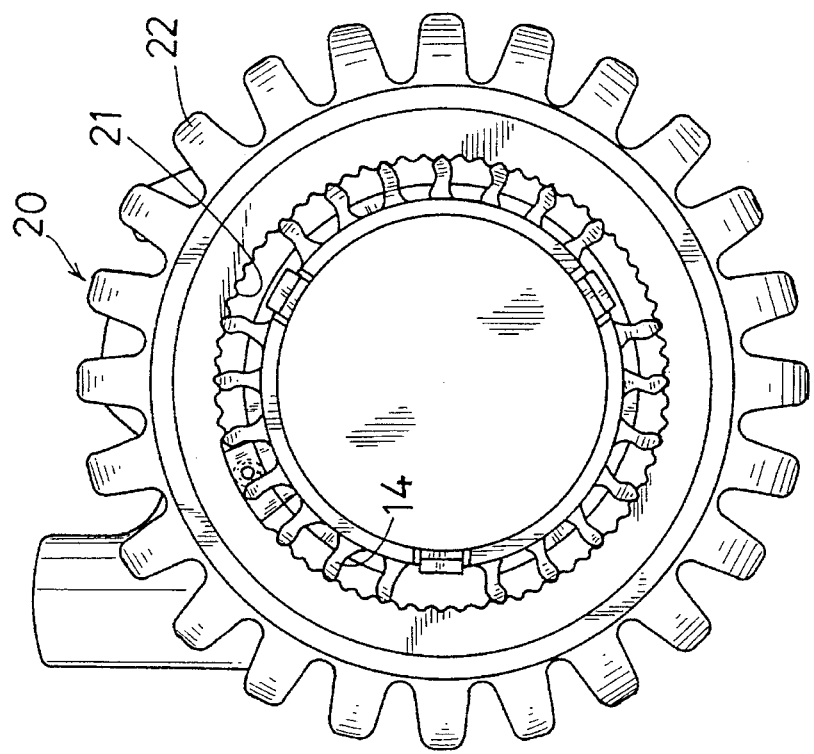
FIG. 5 is a side cross-sectional view of a particular embodiment of the shifting control device shown in FIG. 1.

Numerous elastically deformable engagement teeth 14 are formed in a row in the circumferential direction around the outside surface of the other side of this cylinder in order to rotatably support the above-mentioned rotary control ring 20 while adding frictional force. In hand with this, numerous engagement detents 21 that engage with the above-mentioned engagement teeth 14 are formed around the inside surface of the above-mentioned rotary control ring 20, as can be seen in FIG. 5. The shape and dimensions of these engagement teeth 14 and engagement detents 21 are determined such that the rotary control ring 20 can rotate smoothly with a clicking feel around the outside surface of this base member, and such that the ring can be supported at any engagement position. Further, protrusions 22 are formed around the outside surface of the rotary control ring 20 so that good tactile feel will be achieved.

Figure 7:
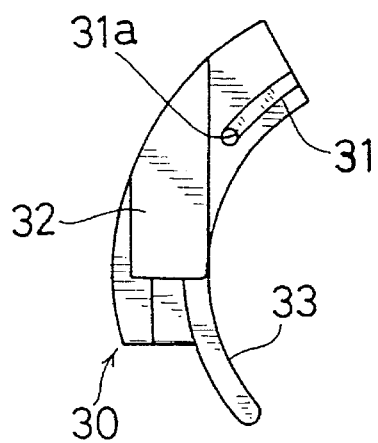
FIG. 7 is a side view of a particular embodiment of a sliding piece according to the present invention used to pull an actuating cable.
Figure 8:
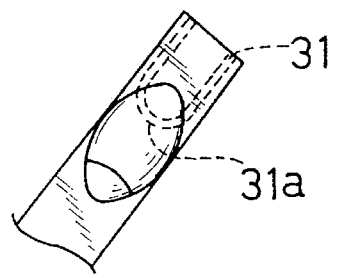
FIG. 8 is a detailed view of a particular embodiment of a curved opening in the sliding piece shown in FIG. 7.

In this embodiment, as shown in FIG. 7, the deflection means 30 is formed as a sliding piece that slides along a guide groove 11 formed in the base member 10, and the shape thereof is essentially that of a partial spiral. A cable fixing hole 32 that is used to fix the end of the inner cable 2a of the control cable 2, and a curved opening 31 through which the relay cable 40 is inserted are provided. A floor 33 that functions as the sliding surface for this sliding piece 30 is worked such that it matches up with a guide surface 11a, which is the bottom of the guide groove 11, which allows for smooth sliding of the sliding piece 30. As is clear from FIG. 8, the curved opening 31 is formed such that the relay cable 40 enters from one sliding direction of the sliding piece 30 and exits in the other direction. A construction in which the heading of the relay cable 40 is deflected by such a curved surface can be produced by molding and working or by sintering, and therefore contributes to a cost reduction during mass production of the deflection means 30.

When tension acts on the relay cable 40, a force that attempts to slide the sliding piece 30 acts on the curved surface 31a on the inside of the curved opening 31. Since, as mentioned above, the inner cable 2a of the control cable 2 is fixed to this sliding piece 30, the work of the sliding piece 30 is transmitted to the shifter or other bicycle working device via the inner cable 2a. In other words, this sliding piece 30 functions as the running block in the principle diagram of FIG. 2a.

The operation of the shifting control device 1 discussed above will now be described.

Figure 3:
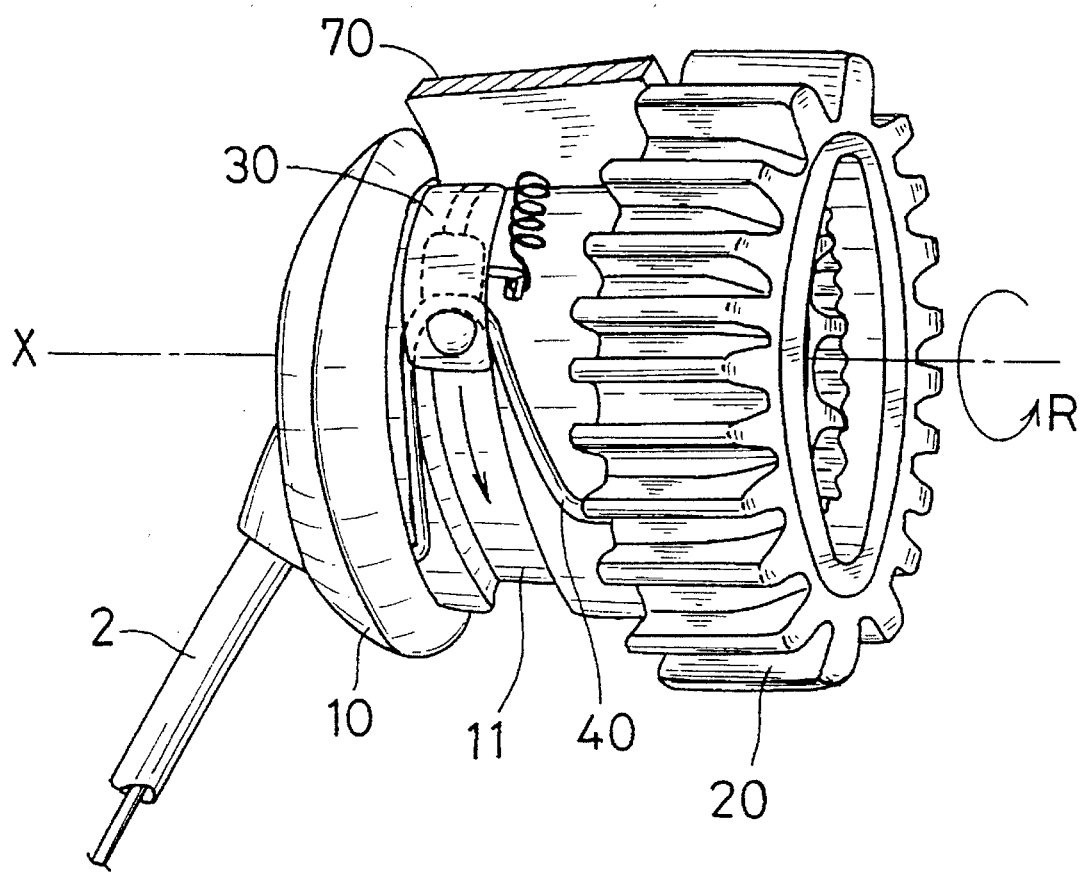
FIG. 3 is a partially cut away oblique view of a particular embodiment of the shifting control device shown in FIG. 1.
Figure 4:
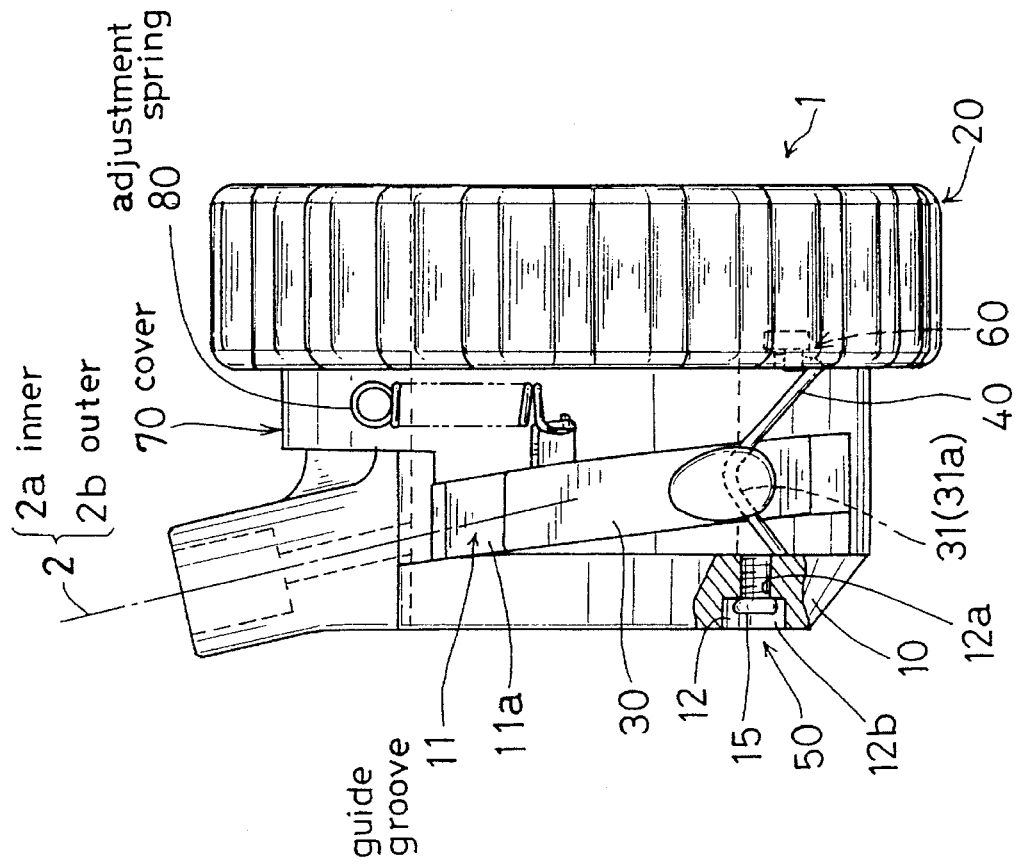
FIG. 4 is a front internal view of a particular embodiment of the shifting control device shown in FIG. 1.

In FIG. 3, when the rotary control ring 20 is rotated in the direction of the arrow R (hereinafter this direction will be referred to as counterclockwise), the tension on the relay cable 40 increases, and this slides the sliding piece 30 counterclockwise along the guide groove 11. As is clear from FIG. 4, the counterclockwise sliding of the sliding piece 30 pulls the inner cable 2a of the control cable 2, and the displacement of this inner cable 2a is transmitted to a derailleur (not shown here), where a shift to a different speed is made (such as shifting up). A derailleur is ordinarily equipped with a return spring, and as a result the spring acts to return the rotary control ring 20 in the clockwise direction so that the sliding piece 30 will slide clockwise. However, the rotary control ring 20 stays put in the desired control position as a result of the positional maintenance force created by the above-mentioned elastically deformable engagement teeth 14 and engagement detents 21. Further counterclockwise rotation of the rotary control ring 20 allows the derailleur speed level to be shifted successively by the same working process.

As is clear from FIG. 2a, which illustrates the principle of the shifting control device of the present invention, the operation effort during shifting is lighter because the rotary control ring 20 pulls the inner cable 2a at about twice the force as the pulling force applied to the relay cable 40 by the principle of a running block.

Next, when the rotary control ring 20 is rotated clockwise, there is a reduction in the tension on the relay cable 40, and as a result the sliding piece 30 slides clockwise along the guide groove 11 while being pulled by the inner cable 2a. Displacement of the inner cable 2a in the direction opposite to the previous direction results in a shifting of speeds by the derailleur in the opposite direction (such as shifting down).

For the sake of visual confirmation of the relation between the rotational control displacement position of the rotary control ting 20 and the speed level of the derailleur effected thereby, graduations can be provided around the outside surface of a cover 70 as shown partially and in simplified fashion in FIG. 3, and an indicator needle that corresponds to these graduations can be provided to the rotary control ring 20, although not shown in the figure. The position of these graduations and the indicator may be switched between the cover 70 and the rotary control ring 20, or a structure may be employed that allows the movement position of the sliding piece 30 to be seen directly.

The adjustment spring indicated by the number 80 in FIG. 4 is used to adjust the balance of forces exerted on the sliding piece 30, which is under the action of tension from the relay cable 40 and the inner cable 2a.

Figure 9:
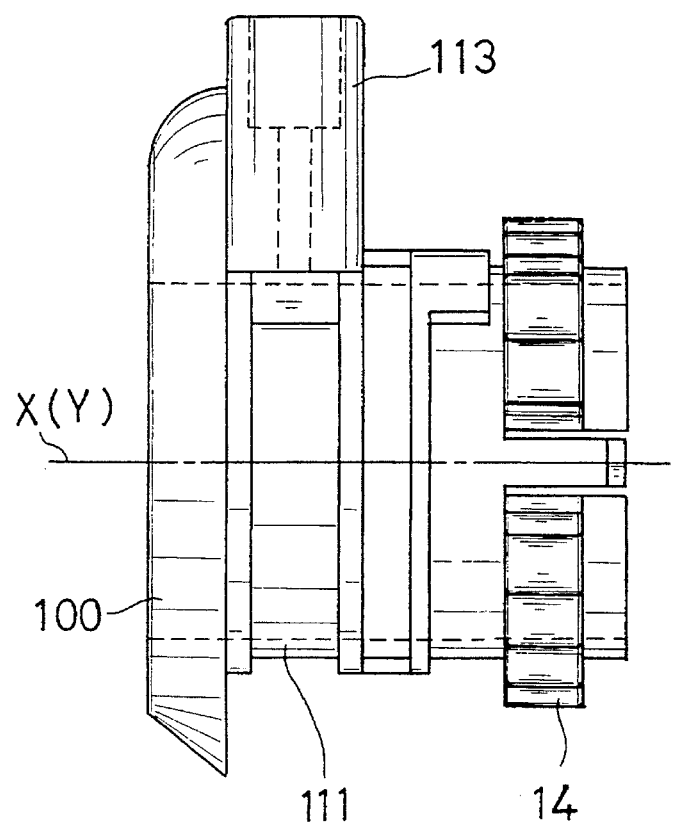
FIG. 9 is a front view of an alternative embodiment of a base member used in the shifting control device shown in FIG. 1.
Figure 10:
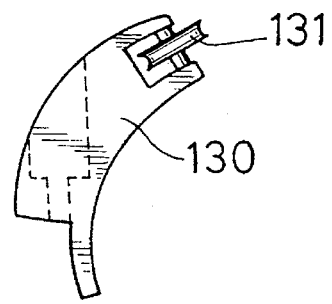
FIG. 10 is a side view of an alternative embodiment of a sliding piece according to the present invention used to pull an actuating cable.

While the above is a description of various embodiments of the present invention, further modifications may be employed without departing from the spirit and scope of the present invention. For example, the base member 110 shown in FIG. 9 is formed with the axis Y that determines the extension direction of the guide groove 111 thereof being concentric with the axis X of the base member 110, and the guide path thereof is not in a spiral as in the above practical example, but rather in the form of an arc. With this structure, the control cable-use nozzle 113 also extends straight in the diameter direction. Such a base member 110 is particularly advantageous in cases in which the shifting control device is arranged in a position in which it is favorable for the control cable 2 to extend at a right angle to the axis X of the base member 110. Naturally, a change in the configuration of the guide groove must be accompanied by a change in the shape of the modified piece 30 as well, and in the case of an arc-shaped guide groove, the modified piece should be in the form of a partial ring.

Since this construction is employed, the displacement transmission mechanism can be positioned in a ring-shaped space, so the overall structure of the control device 1 is compact. An advantage here is that since the guide groove 11 has a guide surface that extends in the circumferential direction having an axis Y, even if the travel of the deflection means 30 is lengthened in order to increase the stroke by which the control cable 2 is displaced, the cylindrical control device 1 will remain virtually the same size overall because the guide groove that is used for this lengthening extends around the outside surface of the base member 10. If the axis Y that determines the extension direction of the guide groove 11 coincides with the axis X of the base member, then the movement locus of the deflection means 30 will be circular, which facilitates the production of the guide groove and the deflection means 30 that is applied to this guide groove. If the axis Y that determines the extension direction of the guide groove 11 is slanted with respect to the axis X of the base member, that is, if the guide groove is formed such that it extends in a spiral around the outside surface of the base member, then a longer guide path can be obtained with an outside surface of the same diameter, and this will also be preferable in cases in which the direction that the control cable 2 extends from the deflection means 30 must be at a right angle to the axis of the base member.

In the above embodiments, the control member 20 was formed as a complete ring that was fitted and rotated around the outside surface of the base member 10, but it may also be a partial ring that moves along the guide path formed in the base member 10. It is also possible to employ a configuration involving an ergonomic approach in which the rotational axis of the control member 20 is slanted with respect to the axis X of the base member, and the rotational control displacement is made to mirror the movement of the thumb as much as possible. If needed, it is also possible to employ a configuration involving a sliding tab that slides along a linear guide path.

The described embodiments involved a configuration in which a curved opening 31 was provided as a through hole to the sliding piece as the deflection means 30, and the extension direction of the relay cable 40 was changed by about 90 degrees by winding with this relay cable 40 inserted into said hole, but in order to eliminate the problem of friction between the relay cable 40 and the curved surface 31a, as shown in FIG. 9, it is also possible for a small pulley 131 to be rotatably provided to the sliding piece 130, and for the sliding piece to serve as the running block itself. An angle of 120 to 180 degrees is favorable for the extension direction of the relay cable changed by the deflection means. This is because exceeding 180 degrees will not usually produce any further benefit in terms of operating effort, and an angle under 120 degrees will not only diminish the obtained benefits in terms of operating effort, but will sometimes result in the overall device being longer in the axial direction. Of course, other embodiments may support different angles of deflection.

The first linking means 50 that fixes the relay cable 40 to the base member 10 can be very simple if it is made up of a through hole provided to the base member and a nipple 15 that prevents slippage of the relay cable 40 inserted in said hole, but the fixing of the relay cable 40 does not necessarily have to be to the base member, and the same function will be fulfilled if this fixing is to a structural member of the bicycle to which the base member is fixed, and such a structure is also within the scope of the present invention.

The above described embodiments represented a shifting control device that involved the use of the principle diagram shown in FIG. 2a, that is, a single running block. However, a shifting control device that involves the use of the principle diagram shown in FIG. 2b, that is, a plurality of running blocks (two in this figure), can also be structured similarly. For example, in the case of two running blocks, two guide grooves 11 are provided side by side to the base member 10, one end of the relay cable that is wound around the sliding piece 30 that slides through the first guide groove 11 is fixed to the base member 10, while the other end is fixed to a second sliding piece 30a that slides through a second guide groove 11, and one end of the relay cable 40 that is wound around the second sliding piece 30a is fixed to the base member 10, while the other end is fixed to the control member 20. As a result the operating effort required by the control member 20 is even lighter. To produce a shifting control device that uses even more running blocks, the number of guide grooves, sliding pieces, and relay cables is similarly increased, with the components being similarly connected in succession.

Thus, the scope of the invention should not be limited by the specific structures disclosed. Instead, the true scope of the invention should be determined by the following claims. Of course, although labelling symbols are used in the claims in order to facilitate reference to the figures, the present invention is not intended to be limited to the constructions in the appended figures by such labelling.

What is claimed is:

1. A bicycle control device comprising:

a base member (10) for attachment to a structural member (3) of the bicycle;

a control member (20) which moves relative to the base member (10);

an elongated member (40) having a first end secured relative to the base member (10) and a second end secured relative to the control member (20) so that movement of the control member (20) relative to the base member (10) causes the second end of the member (40) to move relative to the first end of the member (40); and a linking member (30) disposed between the first end of the member (40) and the second end of the member (40) for movement with the member (40), the linking member (30) having a fixing location for fixing a control element (2a) of the bicycle to the linking member (30).

2. The device according to claim 1 wherein the member (40) comprises a resilient member.

3. The device according to claim 2 wherein the member (40) comprises a cable.

4. The device according to claim 2 wherein the linking member (30) is disposed for moving along the resilient member when the control member (20) moves relative to the base member (10).

5. The device according to claim 4 wherein the linking member (30) includes a curved surface (31a) about which the resilient member winds.

6. The device according to claim 5 wherein an angle formed by the resilient member as it deflects about the linking member (30) is between approximately 120 degrees and approximately 180 degrees.

7. The device according to claim 4 wherein the linking member (30) includes a pulley (131) about which the resilient member winds.

8. The device according to claim 2 wherein the first end of the resilient member is fixed directly to the base member (10), and wherein the second end of the resilient member is fixed directly to the control member (20).

9. The control device according to claim 1 wherein the control member (20) is supported on the base member (10) for rotation about an axis (X).

10. The control device according to claim 9 wherein the base member (10) includes a curved peripheral surface and a guide (11a) disposed thereon, and wherein the linking member (30) is disposed for moving along the guide (11a).

11. The control device according to claim 10 wherein the guide (11a) is oriented generally perpendicular to an axis (Y), and wherein the axis (Y) is orienwA generally parallel to the axis (X).

12. The control device according to claim 10 wherein the guide (11a) is oriented generally perpendicular to an axis (Y), and wherein the axis (Y) is slanted relative to the axis (X).

13. The control device according to claim 9 further comprising resistance imparting means (14,21) disposed between the base member (10) and the control member (20).

14. The control device according to claim 13 wherein the resistance imparting means (14,21) comprises elastically deformable engagement teeth (14) which contact engagement detents (21).

15. The control device according to claim 9 further comprising a spring (80) disposed between the base member (10) and the control member (20).

16. A bicycle control device comprising:

a base member (10) for attachment to a structural member (3) of the bicycle;

a control member (20) which moves relative to the base member (10);

a first member (40a) having a first end secured relative to the base member and a second end secured relative to the control member (20) so that movement of the control member (20) relative to the base member (10) causes the second end of the first member (40a) to move relative to the first end of the first member (40a);

a first linking member (30a) disposed between the first end of the first member (40a) and the second end of the first member (40a) for movement with the first member (40a);

a second member (40) having a first end secured relative to the base member (10) and a second end secured relative to the first linking member (30a) so that movement of the first linking member (30a) relative to the base member (10) causes the second end of the second member (40) to move relative to the first end of the second member (40); and a second linking member (30) disposed between the first end of the second member (40) and the second end of the second member (40) for movement with the second member (40), the second linking member (30) having a fixing location for fixing a control element of the bicycle to the second linking member (30).

17. A bicycle control device for attachment to a handlebar (3) in order to control a working device of the bicycle via a control cable comprising:

a cylindrical base member (10) for mounting substantially coaxially with an axis of the handlebar (3);

a control member (20) supported about an outer peripheral surface of the base member (10) for rotation about the axis of the handlebar;

a relay cable (40) having a first end linked to the base member (10) and a second end linked to the control member (20);

a linking member (30) disposed between the first end of the relay cable (40) and the second end of the relay cable (40);

wherein the linking member (30) is disposed for movement along a guide formed on the base member (10) when the control member (20) rotates relative to the base member (10); and wherein the relay cable (40) passes over the linking member (30) for forming a deflection angle in the relay cable (40) when the control member (20) rotates relative to the base member (10), the linking member (30) having a fixing location for fixing the control cable thereto.

18. The control device according to claim 17 wherein the base member (10) includes a curved peripheral surface and a guide (11a) disposed thereon, and wherein the linking member (30) is disposed for moving along the guide (11a).

19. The control device according to claim 18 wherein the guide (11a) is oriented generally perpendicular to an axis (Y), and wherein the axis (Y) is oriented generally parallel to the axis (X).

20. The control device according to claim 18 wherein the guide (11a) is oriented generally perpendicular to an axis (Y), and wherein the axis (Y) is slanted relative to the axis (X).

21. The control device according to claim 17 further comprising resistance imparting means (14,21) disposed between the base member (10) and the control member (20).

22. The control device according to claim 21 wherein the resistance imparting means (14,21) comprises elastically deformable engagement teeth (14) which contact engagement detents (21).

23. The control device according to claim 17 further comprising a spring (80) disposed between the base (10) and the control member (20).

* * * * *